Patented Sept. 11, 1934

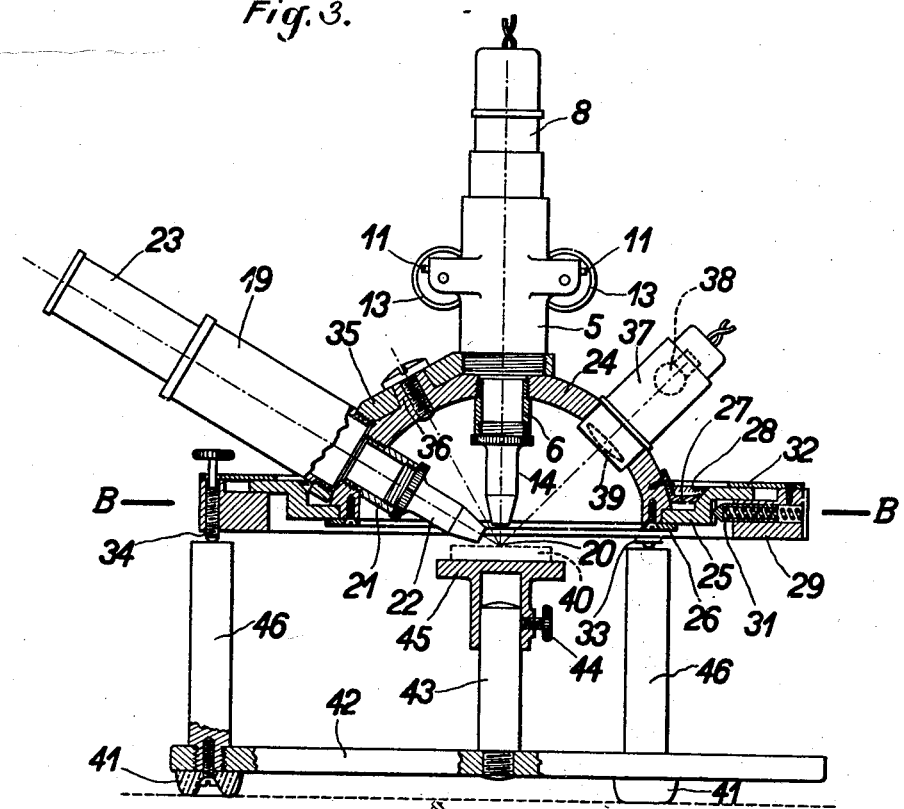
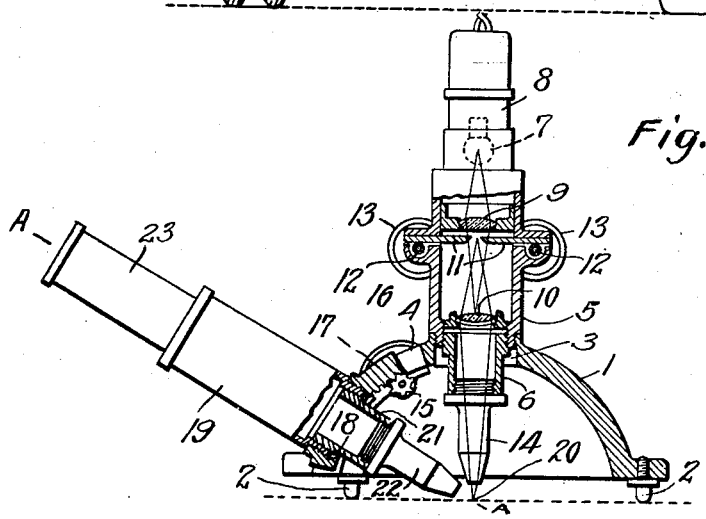

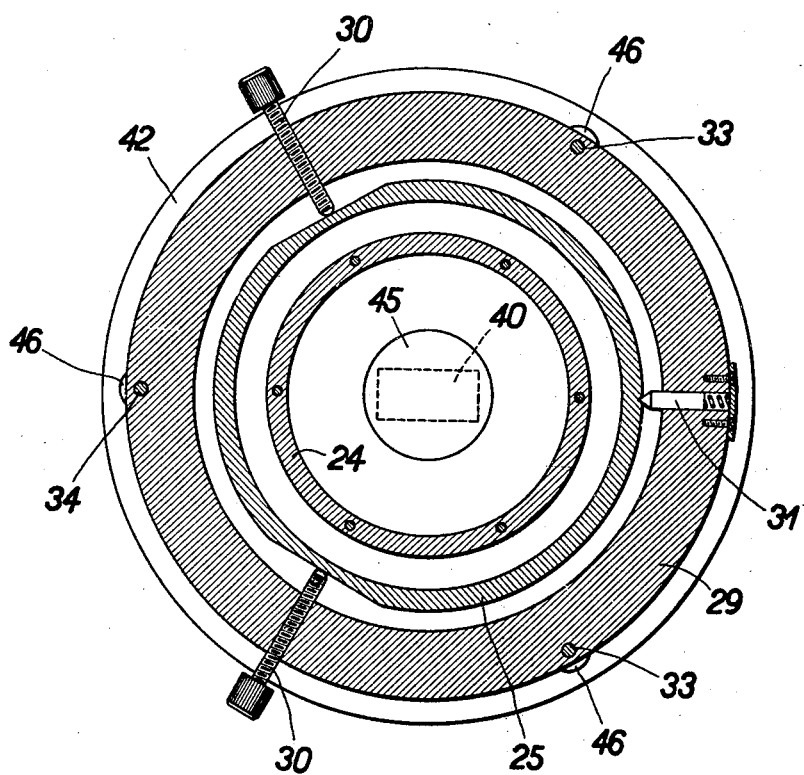
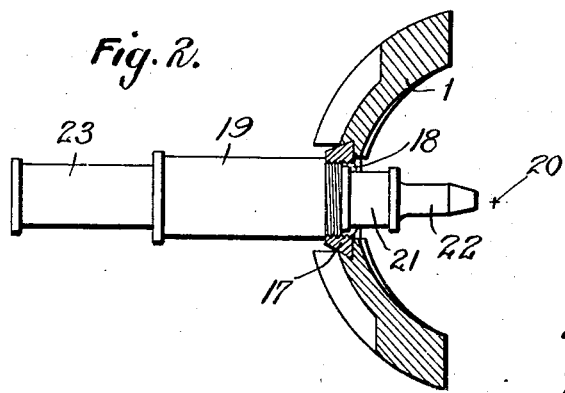

1,973,066

UNITED STATES PATENT OFFICE 1,973,066

MICROSCOPE FOR EXAMINING THE PROFILES OF SURFACES

Friedrich Hauser and Max Hübschmann, Jena, and Gustav Schmaltz, Offenbach, Germany, assignors to the firm Carl Zeiss, Jena, Germany Application November 14, 1933, Serial No. 697,960
In Germany November 11, 1932

6 Claims. (Cl. 88—40)

This invention concerns a method of microscopically examining the profiles of surfaces by means of a microscope in which the axis of the observation system intersects in the object plane the axis of the illumination system that images in the object plane an illuminated slit or an illuminated knife-edge. In other words, there is produced a plane illuminated section through the surface to be examined, and this section may be viewed, and the profile of the surface examined, at an angle relative to the illumination device. To obtain an image of the profile of the unevenness of the surface, the viewing direction is approximately parallel to the surface, and the illumination rays strike this surface conveniently at approximately right angles. This kind of examining surfaces is especially suitable when the profile of the surface is to be photographed or produced on a screen so as to have it seen by a greater number of persons. On the other hand, it is frequently desired to observe at right angles to the surface and to have the illumination rays inclined or approximately parallel to the surface, which corresponds to the effect of the known dark-field illumination.

The object of the invention is a microscope of the type mentioned hereinbefore, in which both kinds of observation may be effected alternately in rapid succession, and this without the necessity of changing the observed object part in the field of view of the observation system. This problem is solved according to the invention by constructing the microscope in such a manner that the observation system and the illumination system are so attached to the microscope stand that they may be interchanged. When passing from the one kind of observation to the other, it is only necessary to interchange the said two systems, the object remaining in its position relative to the microscope stand. With a view to choosing for the object the most favorable direction of illumination when an observation is to take place at right angles, it is advisable to provide that the angle embraced by the axis of the observation system and that of the illumination system is variable.

Changing from one kind of observation to another may be effected within a minimum of time when the two systems are interchanged by means of a changing device. As some of the different constructional parts of the two systems may be equal to each other, it is sufficient to provide that at least those parts by which the observation system differs from the illumination system are mounted on the microscope stand in such a manner that they are rotatable about an axis intersecting the axes of the two systems at their point of intersection. Further, it is not necessary that the two systems may be rotated about the said axis through 360°, because half this rotation will do as a rule.

It has proved to be specially advantageous to give the microscope stand the form of a dome, and to provide that, in case of necessity, the dome-shaped part may be rotated about the dome axis or displaced in the base of the microscope stand in a direction parallel to the object plane.

The accompanying drawings, which illustrate the invention, represent two constructional examples of the invention. Figure 1 shows the first constructional example in part-sectional elevation. Figure 2 is a section through line A—A in Figure 1. Figure 3 represents the second constructional example in part-sectional elevation, and Figure 4 is a section through line B—B in Figure 3.

The microscope stand of the first constructional example (Figures 1 and 2) consists of a spherical dome 1 which rests on three feet 2. The centre of sphere lies in the plane determined by the feet 2, this plane being indicated in the drawings by dash-lines. At its apex, the dome 1 has a bore 3. The dome 1 has a slide guide 4 of the form of a meridional slit. The illumination system is screwed into the bore 3, whose axis coincides with that of the dome 1. This illumination system has a tube 5 and a cylindrical intermediate piece 6 which extends into the interior of the dome 1. At the upper end of the tube 5 is a glow-lamp 7 which is disposed in a lamp housing 8. Below the glowlamp 7 is provided a converging lens 9 which is mounted in the tube 5 and has such a focal length that it images the source of light 7 on a converging lens 10 disposed in the lower end of the tube. Quite near the lower surface of the converging lens 9 are displaceably mounted two plates 11 separated from each other by a slit. These two plates are at right angles to the tube axis and may be displaced by means of milled heads 13 and friction wheels 12. To the lower end of the intermediate piece 6 is screwed a condenser, which is a microscope objective 14. The converging lens 10 has such a focal length that the plane of the slit between the two plates 11 is imaged on the plane of the feet 2 by means of the optical system consisting of the converging lens 10 and the microscope objective 14. In the slide guide 4, a slide 17 may be meridionally displaced by means of a milled head 16 and a driving wheel 15 mounted in the dome 1. The slide 17 has a bore 18 which receives the observation system. To this system belongs a microscope tube 19 which is screwed into the bore 18 and whose axis is radial to the dome 1 and intersects the axis of the illumination system at a point 20 in the plane determined by the feet 2, and this regardless of what position the slide 17 assumes in each particular case. The threads of the tubes 5 and 19 have equal dimensions. At the lower end of the tube 19 are provided an intermediate piece 21 and a microscope objective. At its upper end, the tube 19 has an eye-piece 23. The intermediate piece 21 is of such a length that the objective 22 images the point of intersection 20 of the axes of the observation system and of the illumination system in the ocular image plane.

When using the microscope, the feet 2 of the stand are placed on the surface to be examined, and the glowlamp 7 is connected to an electric circuit. The slit between the plates 11 is imaged on the surface as a narrow strip of light at right angles to the axis of observation, the breadth of this strip being controlled by rotating the milled heads 13. An observer looking at the surface through the eye-piece 23 perceives a profile image which is transverse to the field of view of the observation system. When the observation instrument is provided in the known manner with a photographic camera or a projection device, this image may be reproduced on a plate sensitive to light, or projected on a screen. By turning the milled head 16, the slide 17 may be so displaced in the slide guide 4 as to alter the angle embraced by the axes of the observation and illumination systems. When the examination of the surface is to be effected at right angles to this surface, the tubes 5 and 19 are screwed out, and they are screwed in again when they have been interchanged, so that the observation system now is in the bore 3 and the illumination system in the slide 17. By rotating the milled heads 13, the slit is broadened, the observation device now offering the view of a dark-field image of the surface to be examined in incident light.

In the second constructional example (Figures 3 and 4), an observation and an illumination system are used which correspond substantially to those according to the first example. The parts of the second example have therefore identical reference figures. The microscope objectives 14 and 22 are equal to each other. Contrary to the first, the second constructional example has the intermediate pieces 6 and 21 screwed to a dome-shaped part 24 of the stand and not to the tubes 5 and 19. Into the lower part of the dome 24 extends a ring 25 on which the dome 24 may be rotated. A ring 26 provides that the dome 24 may not be raised from the said ring 25. The dome 24 has an index 27, and the ring 25 is provided with a graduation 28. Similarly to the known microscope stages, the ring 25 is disposed in an exterior ring 29 in such a manner that it may be displaced in its plane, and two screws 30 and a bolt 31 provided with a spring 32 provide that it may not be raised. The exterior ring 29 has two feet 33 and an adjusting screw 34. The two tubes 5 and 19 are screwed into a revolving part 35 which is rotatable about a piece 36 integral with the dome 24. The axis of the piece 36 bisects the angle embraced by the observation and the illumination system and intersects these axes at their point of intersection 20. In the dome 24 is provided also an auxiliary illumination device 37 which directs, by means of a condenser lens 39, the light emanating from a glowlamp 38 to the point 20 and the surrounding of this point.

When in use, the feet 33 and the adjusting screw 34 of the instrument may be placed on the surface to be examined in quite the same manner as is the case with the first example. By rotating the adjusting screw 34 it is attained that the axial point of intersection 20 lies in the surface. When objects of smaller dimensions are to be examined, for instance a sample 40, it is advisable to use an auxiliary device according to what is illustrated in Figures 3 and 4. The auxiliary device has a base plate 42 which rests on three rubber feet 41 and has a column 43 at its centre. On the column 43 is provided an object 45 which is rotatable and may be so adjusted by means of a clamping screw 44 as to suit different heights. At its circumference, the plate 42 has three columns 46 which correspond to the feet 33 and the adjusting screw 34. The microscope is placed on the three columns 46, and the sample 40 is laid on the stage 45. By means of the clamping screw 44, this stage 45 is made to lie at that height at which the point 20 lies in that surface of the sample 40 which is to be examined. By displacing the dome 24 by means of the screws 30, the point 20 on the sample 40 may be made to lie exactly at the place which is to be examined. The observation and the illumination are effected in the same manner as with the first example, the observation offering the advantage that, by rotating the dome 24 on the ring 25, also those profiles of a place on the object 40 may be examined which intersect each other. The angle of rotation of the dome 24 is measured in the known manner by means of the index 27 and the graduation 28. When it is desired to effect the said other kind of examination, the revolving part 35 is rotated at 180° about the piece 36. When this rotation is taking place, the microscope objectives 14 and 22 remain in their positions, and all the other parts of the two systems, in so far as they are connected to the tubes 5 and 19, are interchanged. The observation system is now at right angles to the surface to be examined, and the illumination is effected by means of oblique rays. When it is desired to have the object illuminated from two sides, also the auxiliary illumination device is connected to a current supply. When photographs are to be taken, or when projection images are required, the microscope may naturally be used in quite the same manner as that according to the first constructional example.

We claim:

1. An instrument for the microscopic examination of surfaces, comprising a stand, an illuminating system having a source of light, a body provided with a slit, optical means adapted to direct rays of the source of light to the slit, and other optical means adapted to project on the surface to be examined an image of the slit, the instrument comprising further a microscopic system adapted to be focused at the said image, the axis of the objective of the microscopic system being inclined relatively to the axis of the illumination system, and the said two systems being so attached to the stand as to be interchangeable.

2. An instrument for the microscopic examination of surfaces, comprising a stand, an illumination system having a source of light, a body provided with a slit, optical means adapted to direct rays of the source of light to the slit, and other optical means adapted to project on the surface to be examined an image of the slit, the instrument comprising further a microscopic system adapted to be focused at the said image, the axis of the objective of the microscopic system being inclined relatively to the axis of the illumination system at a variable angle, and the said two systems being so attached to the stand as to be interchangeable.

3. An instrument for the microscopic examination of surfaces, comprising a stand, two microscope objectives provided in the stand in such a manner that their axes diverge relatively to each other, a revolving part so disposed in the stand as to be rotatable about an axis intersecting the axes of the two microscope objectives at their point of intersection, the axis of the said revolving part lying in the plane of the axes of the two microscope objectives and bisecting the angle embraced by the axes of these microscope objectives, a tube disposed on the revolving part, a source of light provided in the tube, a body having a slit and disposed in the tube, optical means disposed between the source of light and the slit and adapted to direct rays of the source of light to the slit, another tube provided on the revolving part, and a microscope eye-piece provided in the said other tube, the axes of the two tubes embracing an angle equal to the one embraced by the axes of the two microscope objectives so as to register with the axes of these two objectives.

4. An instrument for the microscopic examination of surfaces, comprising a dome-shaped stand adapted to surround the part to be examined, an illumination system having a source of light, a body provided with a slit, optical means adapted to direct rays of the source of light to the slit, and other optical means adapted to project on the surface to be examined an image of the slit, the instrument comprising further a microscopic system adapted to be focused at the said image, the axis of the objective of the microscopic system being inclined relatively to the axis of the illumination system, and the said two systems being so attached to the stand as to be interchangeable.

5. An instrument for the microscopic examination of surfaces, comprising a base, a dome rotatably mounted on this base, an illumination system having a source of light, a body provided with a slit, optical means adapted to direct rays of the source of light to the slit, and other optical means adapted to project on the surface to be examined an image of the slit, the instrument comprising further a microscopic system adapted to be focused at the said image, the axis of the objective of the microscopic system being inclined relatively to the axis of the illumination system, and the said two systems being so attached to the dome as to be interchangeable.

6. An instrument for the microscopic examination of surfaces, comprising a base, a dome so mounted on the base as to be displaceable parallel to the surface to be examined, an illumination system having a source of light, a body provided with a slit, optical means adapted to direct rays of the source of light to the slit, and other optical means adapted to project on the surface to be examined an image of the slit, the instrument comprising further a microscopic system adapted to be focused at the said image, the axis of the objective of the microscopic system being inclined relatively to the axis of the illumination system, and the said two systems being so attached to the said dome as to be interchangeable.

FRIEDRICH HAUSER.
MAX HÜBSCHMANN.
GUSTAV SCHMALTZ.